(No Model.)

A. CABLE.
FISHING ROD.

No. 499,779. Patented June 20, 1893.

Witnesses
F. P. Rosengarten
A. H. Rosengarten

Inventor
Albert Cable

By his Attorney
Horace B. McCoy

UNITED STATES PATENT OFFICE.

ALBERT CABLE, OF POTTSVILLE, PENNSYLVANIA.

FISHING-ROD.

SPECIFICATION forming part of Letters Patent No. 499,779, dated June 20, 1893.

Application filed April 8, 1891. Serial No. 388,113. (No model.)

*To all whom it may concern:*

Be it known that I, ALBERT CABLE, a citizen of the United States, residing at Pottsville, in the county of Schuylkill and State of Pennsylvania, have invented certain new and useful Improvements in Fishing-Rods; and I do hereby declare the following to be a full, clear, and exact description of the invention, such as will enable others skilled in the art to which it appertains to make and use the same.

My invention relates to improvements in fishing rods in which the joints joining the different sections of the rod together, are secured by means of ferrules; and my object is to provide joints that can be firmly and readily secured and that will allow the rod to be folded up when not in use. I attain my object by the use of the device shown in the accompanying drawings, in which—

Figure 2:
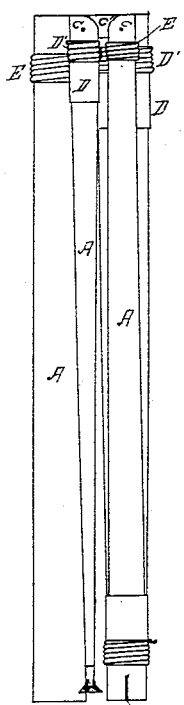
Figure 1:
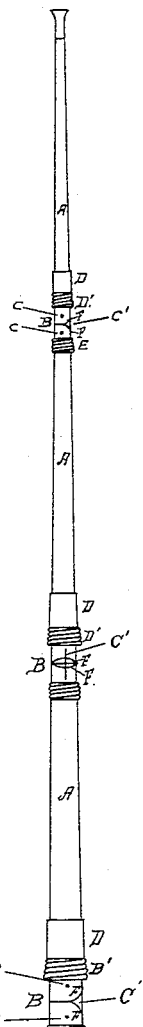
Figure 3:
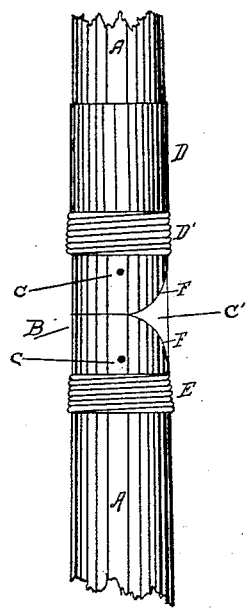

Figure 1 is a view of a fishing rod as I construct it. Fig. 2 is a view of the same folded up and Fig. 3 is an enlarged view of one of the joints showing the manner of securing the sections of the rod together.

Similar letters of reference indicate like parts in the several views.

In the drawings A A A A represent the sections of a fishing rod.

B B B are hinge joints, C C being pins running through the metal blade or strip C' which forms the hinge.

D is a sliding ferrule one end of which D' is provided with a screw thread which coincides with the thread on the fixed ferrule E.

The corners of the rod sections A A A A are rounded off on one side at F F F F so that the sections may be folded together. The top and lower joints are placed alike while the middle joint is at right angle with them. This permits the rod to be folded in the form shown in Fig. 2. When the rod is extended the sliding ferrules D D D are slipped down over the joints B B B and screwed on the ferrules E E E which are securely fastened to the sections of the rod. This makes the joints rigid and strong. The screwing together of the ferrules prevents any possibility of their becoming loose while the rod is being used. It will be readily seen that no part of this rod can be misplaced or lost; that it can be folded up compactly and that the line may be left on the rod when it is folded, so that it will be ready for immediate use as soon as the rod is extended.

I am aware that rods have been hinged together but they have been held together by loose ferrules or springs which are not reliable in use, while my device cannot become loose unless intentionally unscrewed.

What I claim, and desire to secure by Letters Patent, is—

The combination in a fishing rod composed of sections hinged together, of a fixed ferrule and a movable ferrule, both screw threaded and adapted to be connected one with the other and covering each hinged joint substantially as shown and set forth.

In testimony whereof I affix my signature in presence of two witnesses.

ALBERT CABLE.

Witnesses:
  F. C. EBERLE,
  WILLIAM HERRMANN.